United States Patent [19]
Roller et al.

[11] Patent Number: 6,065,882
[45] Date of Patent: May 23, 2000

[54] SNAP-IN PROXIMAL CONNECTOR FOR MOUNTING AN OPTIC FIBER ELEMENT INTO A LIGHT SOURCE SYSTEM

[75] Inventors: Thomas W. Roller, Moorpark; Kenneth K. Li, Arcadia, both of Calif.

[73] Assignee: Cogent Light Technologies, Inc., Santa Clarita, Calif.

[21] Appl. No.: 09/090,871

[22] Filed: Jun. 5, 1998

Related U.S. Application Data

[63] Continuation-in-part of application No. 08/831,351, Apr. 1, 1997, Pat. No. 5,764,837, which is a continuation-in-part of application No. 08/502,068, Jul. 14, 1995, Pat. No. 5,640,478.

[51] Int. Cl.[7] ........................................... G02B 6/36
[52] U.S. Cl. ................ 385/92; 385/78; 385/136
[58] Field of Search ............................ 385/88–94, 136, 385/78

[56] References Cited

U.S. PATENT DOCUMENTS

| | | | |
|---|---|---|---|
| 3,948,582 | 4/1976 | Martin | 385/56 |
| 4,273,413 | 6/1981 | Bendiksen et al. | 385/88 |
| 4,737,008 | 4/1988 | Ohyama et al. | 385/88 |
| 4,772,081 | 9/1988 | Borgos et al. | 385/89 |
| 4,824,202 | 4/1989 | Auras | 385/93 |
| 4,875,755 | 10/1989 | Borgos et al. | 350/96.2 |
| 4,883,333 | 11/1989 | Yanez | 385/33 |
| 5,076,660 | 12/1991 | Messinger | 385/31 |
| 5,142,600 | 8/1992 | Ortiz, Jr. | 385/83 |
| 5,216,735 | 6/1993 | Rondeau | 385/78 |
| 5,619,602 | 4/1997 | Sandstrom et al. | 385/126 |
| 5,640,478 | 6/1997 | Roller | 385/92 |
| 5,661,834 | 8/1997 | Watanabe et al. | 385/92 |
| 5,764,837 | 6/1998 | Roller | 385/92 |

FOREIGN PATENT DOCUMENTS

| | | |
|---|---|---|
| 0519219 | 12/1992 | European Pat. Off. . |
| 9316407 | 8/1993 | WIPO . |
| 9704341 | 2/1997 | WIPO . |
| 9844371 | 10/1998 | WIPO . |

*Primary Examiner*—Hung N. Ngo
*Attorney, Agent, or Firm*—Rothwell, Figg, Ernst & Kurz, P.C.

[57] ABSTRACT

A proximal connector includes a stainless steel, cone-shaped ferrule enclosing a proximal end of the optic fiber element. The ferrule is inserted within a matching aperture of a receiving block, which is also made of stainless steel. The matching shapes of the ferrule and the aperture of the receiving block ensure effective heat transfer from the ferrule into the receiving block. The receiving block may be provided with cooling vanes, and air may be circulated over the cooling vanes, to dissipate heat transferred to the receiving block from the connector. Both ferrule and the aperture are axially symmetric such that any rotation of the proximal connector while inserted into the receiving block does not change the location of the entrance aperture of the optic fiber element. The proximal connector also includes a case having an indented ring. A ball plunger biasing mechanism is mounted within the aperture of the receiving block and is positioned to engage the indented ring only while the proximal connector is fully and securely inserted within the aperture. The plunger prevents accidental removal of the proximal connector while also providing a biasing force for ensuring solid contact between the cone-shaped ferrule and the corresponding portions of the receiving block to further facilitate heat conduction. The concept may be extended to provided adaptor connectors which couple such proximal connectors to an appropriately configured receiving block.

15 Claims, 7 Drawing Sheets

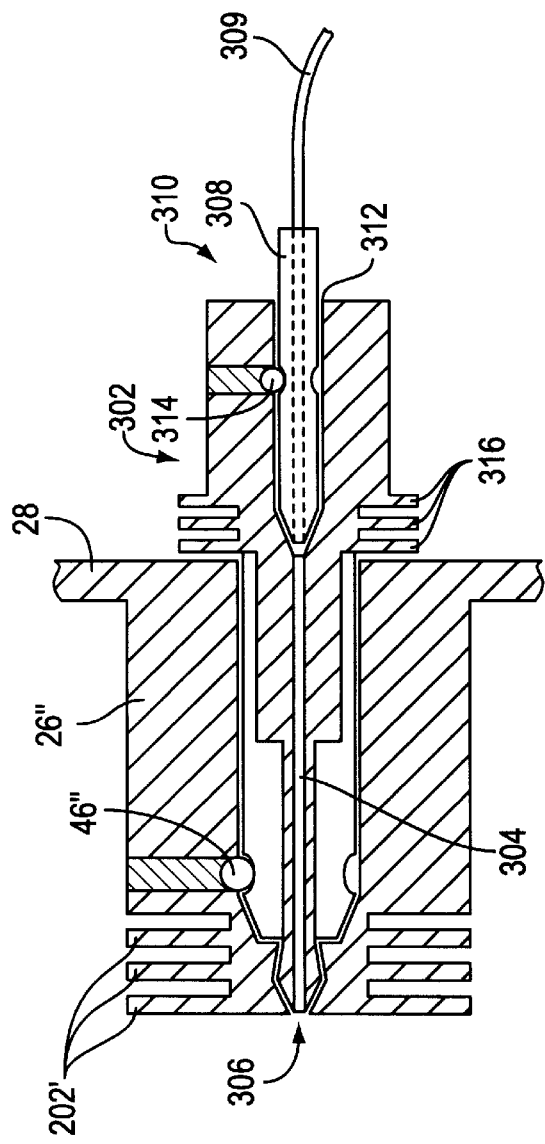
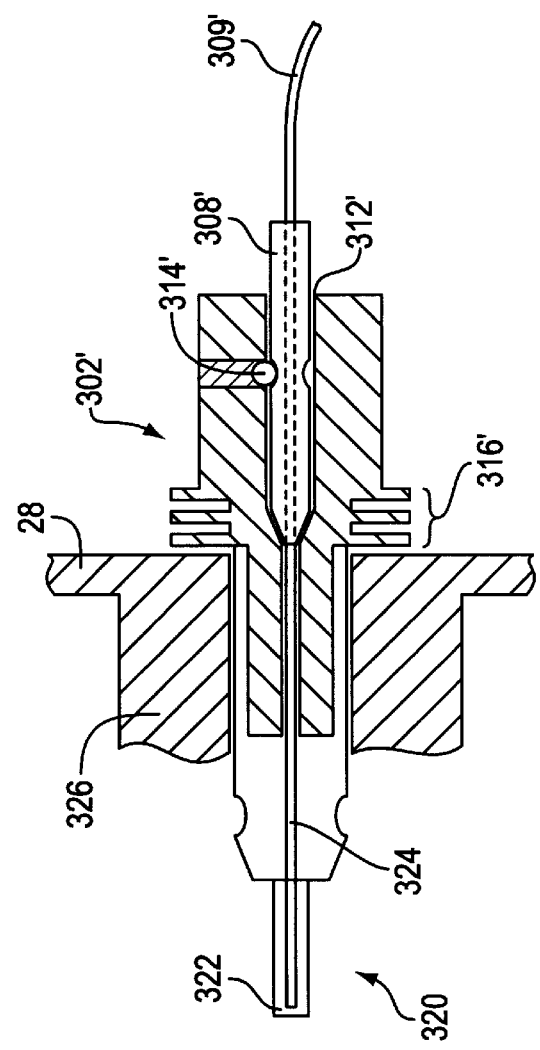
FIG. 7
FIG. 8

SNAP-IN PROXIMAL CONNECTOR FOR MOUNTING AN OPTIC FIBER ELEMENT INTO A LIGHT SOURCE SYSTEM

This application is a continuation-in-part of U.S. application Ser. No. 08/831,351 filed Apr. 1, 1997, now U.S. Pat. No. 5,764,837, which is a continuation-in-part of U.S. application Ser. No. 08/502,068 filed Jul. 14, 1995, now U.S. Pat. No. 5,640,478.

BACKGROUND OF THE INVENTION

1. Field of the Invention

The invention generally relates to optical systems for coupling light into a single optic fiber or fiber bundle and, in particular, to connector assemblies for connecting a single optic fiber or fiber bundle into the housing of a light source system.

2. Description of Related Art

A variety of light source systems have been developed for coupling light from a high intensity light source such as an arc lamp into an optical fiber bundle or single optical fiber. The light coupled into the bundle or single fiber may be used, for example, for medical illumination purposes such as for use with a surgical luminaire, headlamp, endoscope or borescope.

Typically, a proximal end of the single fiber or fiber bundle is mounted within a proximal connector for insertion into a slot or aperture within a housing containing the light source. A distal end of the single fiber or fiber bundle is connected to an application device, i.e., a surgical luminaire, endoscope, etc. Typically, the proximal connector is configured to be removed from the light source system.

This allows a person operating the application device, such as a surgeon using a surgical headlamp, to have free mobility, which may be otherwise hindered while the fiber or fiber bundle is connected into the light source system. The provision of the removable proximal connector also allows a single light source system to be used to provide light for a variety of different application devices, each having a corresponding proximal connector.

However, problems arise in many conventional proximal connectors, particularly those designed for use with a single optic fiber. Single fibers require high intensity light to be directed onto an entrance aperture of the single fiber held by the proximal connector. Conventional proximal connectors for single fibers generally support silica fibers for which heat is not a problem. If the materials of the optical fiber are susceptible to thermal damage, a method of removing the heat is necessary to assure continued operation. For silica fibers having a polymer cladding, excess heat of a conventional connector will destroy the cladding. To remedy this problem, some previous light source systems have been configured to position the proximal entrance aperture of the single fiber some distance from the proximal connector itself. The high intensity light is then focused at the entrance aperture of the single fiber which is offset from the proximal connector itself. Hence, the proximal connector is not significantly heated. However, because the entrance aperture of the single fiber extends from the proximal connector, the fiber is unprotected and easily broken or otherwise damaged after removal from the light source system.

At least one proximal connector includes a slidable housing designed to protect the fiber. The housing retracts while the connector is mounted to the light source system to allow the single fiber to receive light. The slidable housing slides outwardly, as the connector is removed from the light source system to enclose and protect the optic fiber. See, for example, U.S. Pat. No. 5,446,818, the disclosure of which is incorporated herein by reference. Although such an arrangement protects the proximal end of the optic fiber while also minimizing heat related problems, such is achieved at the expense of requiring a relatively complicated proximal connector having a number of moving parts susceptible to damage or malfunction.

Other problems arise with proximal connectors having an optic fiber extending beyond the connector itself. As noted above, single fibers require precise positioning of the entrance aperture of the fiber with respect to the optical components of the light source system which is complicated by having the fiber extend beyond the connector. Moreover, polishing such fibers protruding beyond the proximal connectors is difficult and not readily manufacturable.

It would be desirable to provide an improved proximal connector which avoids the disadvantages of conventional proximal connectors described above. It is to this end that aspects of the present invention are drawn.

SUMMARY OF THE INVENTION

A proximal connector for connecting an optic fiber element such as a single optic fiber or fiber bundle into the housing of a light source system is provided. The proximal connector includes a cone-shaped ferrule mounted around a proximal end of the single fiber designed for both alignment and heat sinking. The cone-shaped ferrule is sized and configured for mounting within a cone-shaped slot or aperture within a receiving block of the housing. While inserted, an exterior sidewall of the cone-shaped ferrule rests snugly against an interior sidewall of the receiving block. High intensity light is directed into an entrance aperture of the proximal end of the single fiber. The entrance aperture is aligned with a truncated end of the cone-shaped ferrule.

The cone-shaped ferrule and the receiving block are both formed of stainless steel or other metals or alloys having a high index of heat conduction. Accordingly, heat generated within the cone-shaped ferrule from the high intensity light is conducted into the receiving block of the housing, thereby keeping the cone-shaped ferrule and the single fiber enclosed therein relatively cool. As noted, the fiber optic does not extend from the truncated end of the cone-shaped ferrule, but lies flush therewith. Hence, upon removal from the housing, the optic fiber element is protected by the cone-shaped ferrule from possible damage. In this manner, heating problems and breakage problems are both substantially eliminated. Furthermore, the entrance aperture of the fiber optic can be polished because it is secured within the ferrule.

In one embodiment, the receiving block includes a spring-loaded ball plunger to ensure that the ferrule remains snugly mounted within the aperture of the receiving block. The ferrule is mounted in a case that includes an indented ring. The ball plunger and the indented ring are relatively positioned such that the ball plunger rests within the indented ring only while the ferrule is fully inserted within the aperture. When so engaged, the ball plunger prevents the ferrule from sliding out from the aperture. The ball plunger holds the ferrule in place until sufficient manual force is applied to disengage the ball plunger. Because the ferrule is held in place, lateral alignment, along the direction of insertion of the ferrule, of the entrance aperture of the single fiber is ensured.

The cone-shaped ferrule and the matching aperture of the receiving block are both axially symmetric such that longitudinal alignment is also ensured. In other words, rotation of the ferrule within the aperture does not cause any displacement of the entrance aperture of the fiber, but merely rotates the fiber, which itself is axially symmetric. Thus, positioning problems of the type discussed are also avoided.

Thus, the above-described problems of conventional proximal connectors are eliminated by employing the simple cone-shaped ferrule of the invention. Moreover, no moving parts are required and the cost of the proximal connector is thereby minimized. The resulting proximal connector is simply, reliably, and easily manufacturable. Hence, the general objective set forth above is achieved.

In another aspect, means for connecting an optic fiber element such as a single optic fiber or fiber bundle into the housing of a light source system is provided, with the housing and/or fiber connector means configured such that light passing through the optic fiber element or bundle can have a power level within a range of greater than one watt and up to approximately 100 watts.

In preferred embodiments, a cone-shaped ferrule is mounted around a proximal end of the optic fiber element and is designed for both alignment and heat sinking. In one such preferred embodiment, the ferrule constitutes part of a proximal connector as described above. In another preferred embodiment, the ferrule is formed at a light-receiving end of an adaptor connector, which receives at an opposite end a proximal connector as described above. The ferrule is sized and configured for mounting with a cone-shaped aperture formed either within a receiving block that extends into the housing or in an end of an adaptor connector, and means for facilitating heat removal are provided on the receiving block and/or on the adaptor connector. While inserted in the aperture (whether the aperture is in the housing or in the end of the adaptor connector), an exterior side wall of the cone-shaped ferrule rests snugly in heat-transferring relationship against interior side walls of the aperture. Higher intensity light can thus be transmitted through the optic fiber element, the optic fiber element being either an intermediate, coupling optic fiber housed within an adaptor connector or the optic fiber element housed within a proximal connector and transmitting light to, for example, a luminaire, headlamp, endoscope, or borescope

BRIEF DESCRIPTION OF THE DRAWINGS

FIG. 7 is a side view, partially in cross-section, of an embodiment which is similar to that shown in FIG. 6, but with the additional provision of a heat-dissipating adaptor connector.

FIGS. 8 and 9 are side views, partially in cross-section with FIG. 8 being partially broken away, of other embodiments employing heat-dissipating adaptor connectors similar to that shown in FIG. 7.

DETAILED DESCRIPTION OF EXEMPLARY EMBODIMENTS OF THE INVENTION

With reference to the figures, exemplary embodiments of the invention will now be described. These embodiments illustrate principles of the invention and should not be construed as limiting the scope of the invention.

Figure 1:
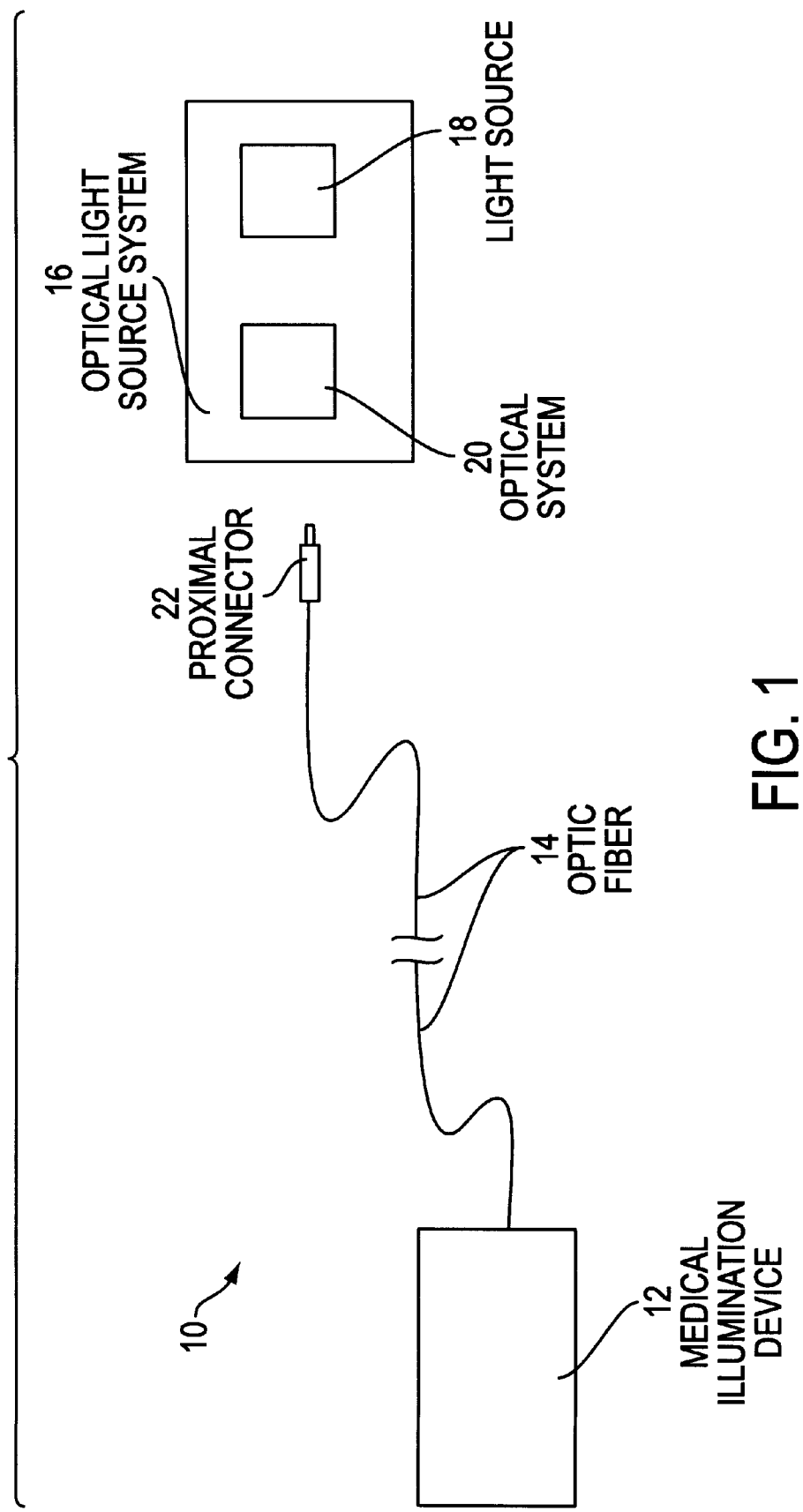
FIG. 1 is block diagram illustrating a medical illumination system providing light from a light source system to a single optical fiber into a medical illumination device.

FIG. 1 illustrates an illumination system 10 having, for example, a medical device 12 connected through a single fiber optic 14 to a light source system 16. Medical device 12 may be a surgical headlamp, surgical luminaire, endoscope, borescope, etc. Light source system 16 includes a high intensity light source 18, such as a metal halide or xenon arc lamp, and an optical system 20 for collecting and condensing light from source 18. Optical system 20 may include one or more optical elements such as mirrors, configured, for example, in accordance with the source system described in U.S. Pat. No. 4,757,431.

Fiber optic 14 includes a proximal connector 22 configured for "snap" insertion into an aperture formed in a receiving block of a housing of light source system 16. Proximal connector 22 and the receiving block in which it is inserted will now be described with reference to the remaining figures.

Figure 2:
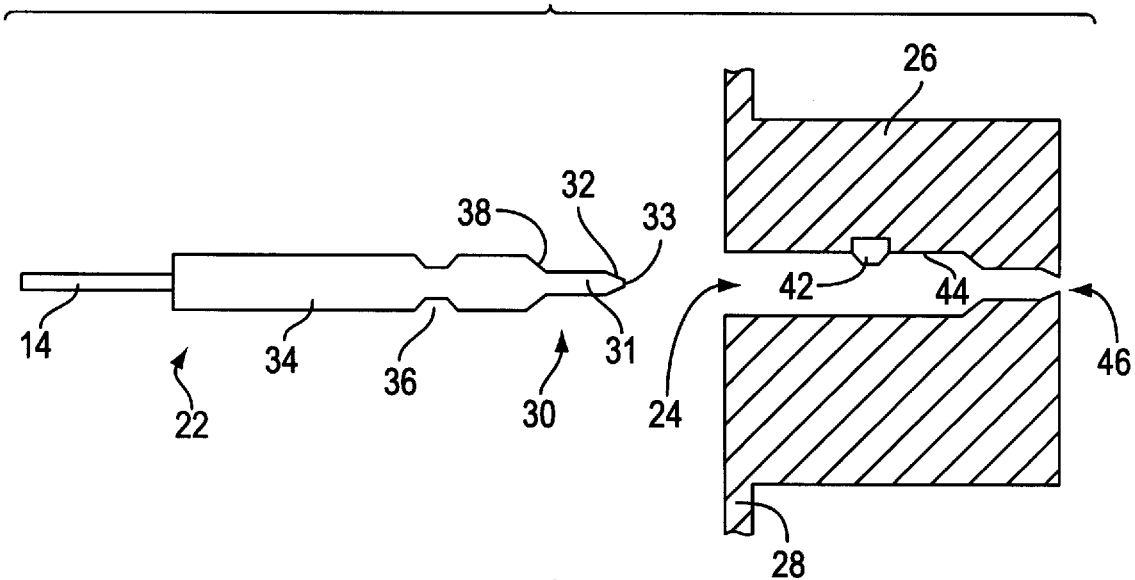
FIG. 2 is a side view, partially in cross-section, of a proximal connector of the fiber optic of FIG. 1 and a portion of the housing of the light source system of FIG. 1.

FIG. 2 provides a sideview of proximal connector 22 positioned prior to insertion into an aperture 24 of a receiving block 26 of a housing 28 of light source system 16. Proximal connector 22 includes a three-dimensional symmetrical profile matching the interior profile of aperture 24. More specifically, proximal connector 22 includes a stainless steel ferrule 30 having a cylindrical base portion 31 and a tapering cone-shaped tip 32 with a truncated end 33. Base portion 31 is mounted within a case 34 which is substantially right-cylindrical but includes an indented ring 36 offset a distance from a tapered, truncated portion 38. Optic fiber 14 is held within an internal bore within case 34 and ferrule 30. An entrance aperture of optic fiber 14 lies flush with the front truncated end 33 of ferrule 30 (and therefore is not visible in the Figure).

Figure 3:
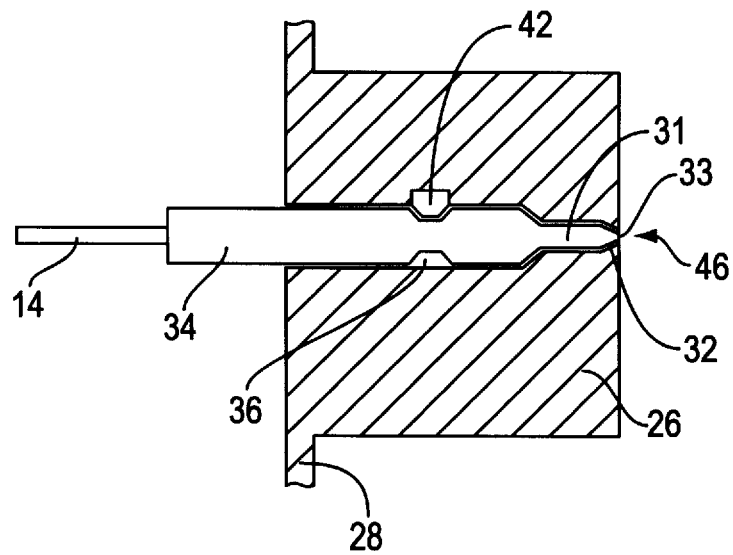
FIG. 3 is a side view, partially in cross-section, of the elements of FIG. 2 shown with the proximal connector fully inserted within an aperture of the receiving block.

As noted, the profile of the proximal connector is matched to the internal profile of aperture 24. In other words, aperture 24 includes cylindrical and conical portions having substantially the same size and shape as corresponding portions of the proximal connector. One exception, however, is that the aperture does not define an outwardly extending ring shaped to match indented ring 36. Rather, a ball plunger spring-biasing mechanism 42 is mounted along an inner sidewall 44 of housing block 26. Ball plunger 42 is positioned such that it engages with indented ring 36 only while proximal connector is fully inserted within aperture 24. This is illustrated in FIG. 3. Ball plunger 42 thus allows the proximal connector be snapped into place during insertion.

The ball plunger prevents the proximal connector from accidentally sliding out of the aperture. The proximal connector can only be manually removed by pulling on the proximal connector with sufficient force to displace the ball plunger out of the indented ring allowing free removal of the connector. Of course, alternative biasing mechanisms may be employed. For example, the ball plunger may be mounted to the case of the proximal connector with the ring formed within the housing. As another alternative, the case may be formed with a resilient, outwardly extending ring and the aperture formed with a matching ring. Upon insertion of the proximal connector, the resilient ring of the case bends inward slightly until reaching the matching ring of the housing, then snaps outward into the matching ring of the housing.

Continuing with the embodiment of the figures, the profile of the proximal connector is matched to the internal profile of the aperture of the receiving block, in part, to facilitate heat transfer from the connector into the receiving block. In use, high intensity light is focused or condensed or otherwise directed to a point or spot 46 which corresponds to the entrance aperture of the optic fiber while the connector is inserted in the receiving block. The intensity of light in the vicinity of 46 causes ferrule 30 to heat. However, heat generated within the ferrule is quickly conducted away from the tip of the ferrule and ultimately into the receiving block. To facilitate heat transfer, both the ferrule and the receiving block are preferably formed of stainless steel. By conducting heat away from the tip of the ferrule, the ferrule remains relatively cool such that, on removal of the proximal connector, the ferrule does not need to be shielded and persons touching the tip of the ferrule are not at risk from being burned.

Preferably, the dimension of the proximal connector and of the aperture are fabricated to fairly close tolerances to ensure that the ferrule of the proximal connector contacts the inner walls of the receiving block over the entire external surface area of the ferrule. Any gaps therebetween may hinder the conduction of heat from the ferrule.

As noted, ferrule 30 may be formed of stainless steel. In one embodiment, case 34 is formed of plastic. However, for some applications, perhaps to provide even greater heat conduction, case 34 may also be formed of stainless steel. As can be appreciated, wide variety of choices of materials can be employed consistent with the principles of the invention. Likewise, although the particular cylindrical and conical shapes thus far described have been found to be effective, other shapes may also be effective. Of course, for whatever shapes are chosen, the shape of the ferrule should closely match the shape of the corresponding aperture, at least within the region of expected heat conduction. In other words, portions of the proximal connector and aperture which are remote from the end of the fiber need not match as closely since less heat conduction is required at positions remote from the end of the optic fiber.

Another aspect of the configuration of the proximal connector and of the aperture is that both are substantially axially symmetric. Hence, the proximal connector can be freely rotated within the aperture without displacing the entrance aperture of the optic fiber. Hence, precise axial positioning is maintained. Lateral positioning of the tip of the fiber along the direction of insertion is maintained by the ball plunger which rests within indented ring 36. Precise positioning of the entrance aperture of the fiber is thereby maintained. As noted above, because the entrance aperture of the fiber lies flush with the truncated end of the ferrule, the entrance aperture can be polished to provide improved optical characteristics.

Figure 4:
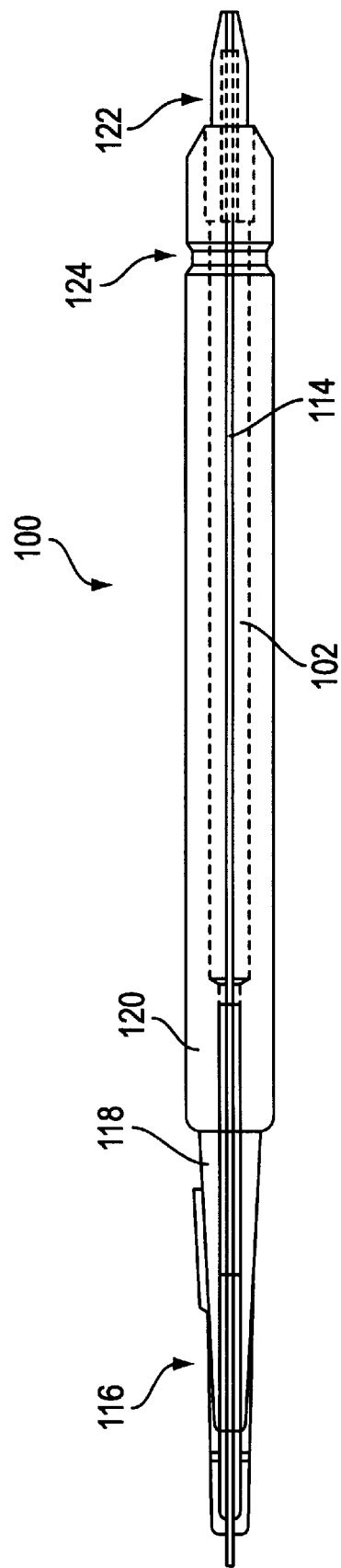
FIG. 4 is a side view of a specific proximal connector showing internal components in phantom lines.

FIG. 4 provides a cross-sectional illustration of a specific proximal connector configured as generally described with reference to FIGS. 1–3. In particular, FIG. 4 illustrates the internal structure of the proximal connector which holds the fiber optic. More specifically, proximal connector 100 of FIG. 4 includes a bore 102 through which fiber optic 114 passes. A distal portion of the optic fiber is secured by a clasp member 116 which also mounts to a cone-shaped distal end 118 of case 120. As with the proximal connector of FIGS. 2 and 3, proximal connector 100 of FIG. 4 includes a ferrule having a conical end 122. Case 120 also includes an indented, longitudinally extending ring 124.

Figure 5:
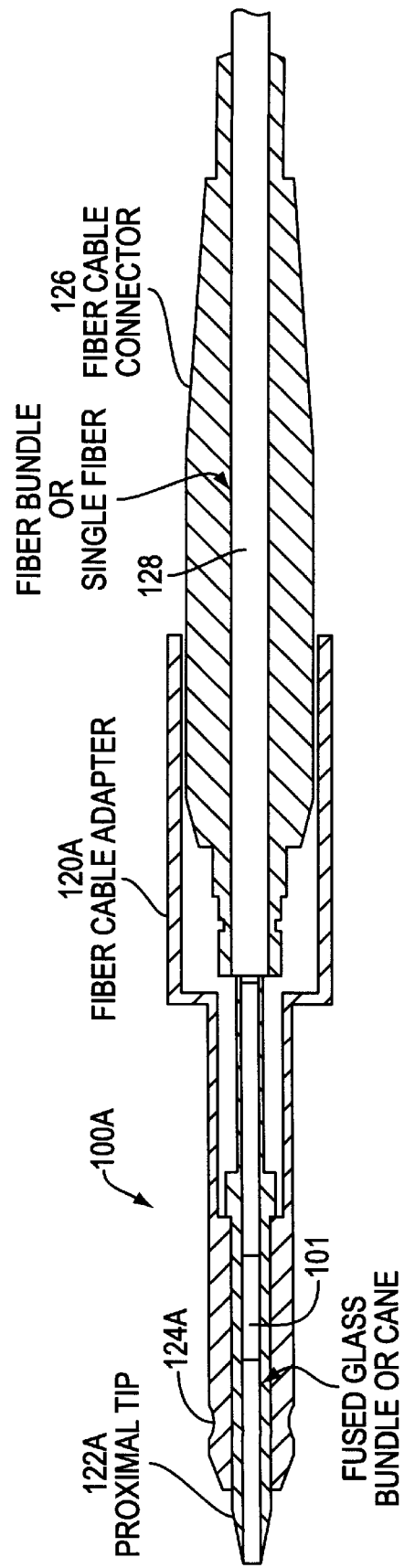
FIG. 5 is a cross-sectional view of another embodiment of a proximal connector in accordance with the present invention.

In general, what has been described is an improved proximal connector for use with an optical illumination system employing a single optic fiber. In particular, the invention enables the use of temperature sensitive materials in the construction of single optical fibers. Principles of the invention, however, can be applied to other systems and to other applications as well. For example, principles of the invention may be applicable to optical illumination systems incorporating other optical fiber elements such as fiber bundles or the like. For example, FIG. 5 shows a proximal connector 100A through which a fiber optic element passes which is comprised of a fused glass bundle or cane 101, terminating at the conical proximal tip end 122A. This embodiment includes a fiber cable adaptor case 120A having an indented, longitudinally extending ring 124A. Fiber cable adaptor case 120A receives a fiber cable connector 126 through which passes a fiber bundle or single fiber 128.

The above-described embodiments of the present invention can couple light from high intensity light sources having power levels within the range of, for example, from about 300 mw to about 1000 mw. In accordance with one such embodiment, a high intensity light source for use in a system in accordance with the present invention has a power level of from about 400 mw to about 500 mw.

For other applications, it may be desirable to provide even higher intensity light sources and to couple anywhere from one to approximately 100 W of light into the optic fiber element or bundle of elements. With such increased light intensity, it will be appreciated that considerably more heat is generated which must be dissipated.

Figure 6:
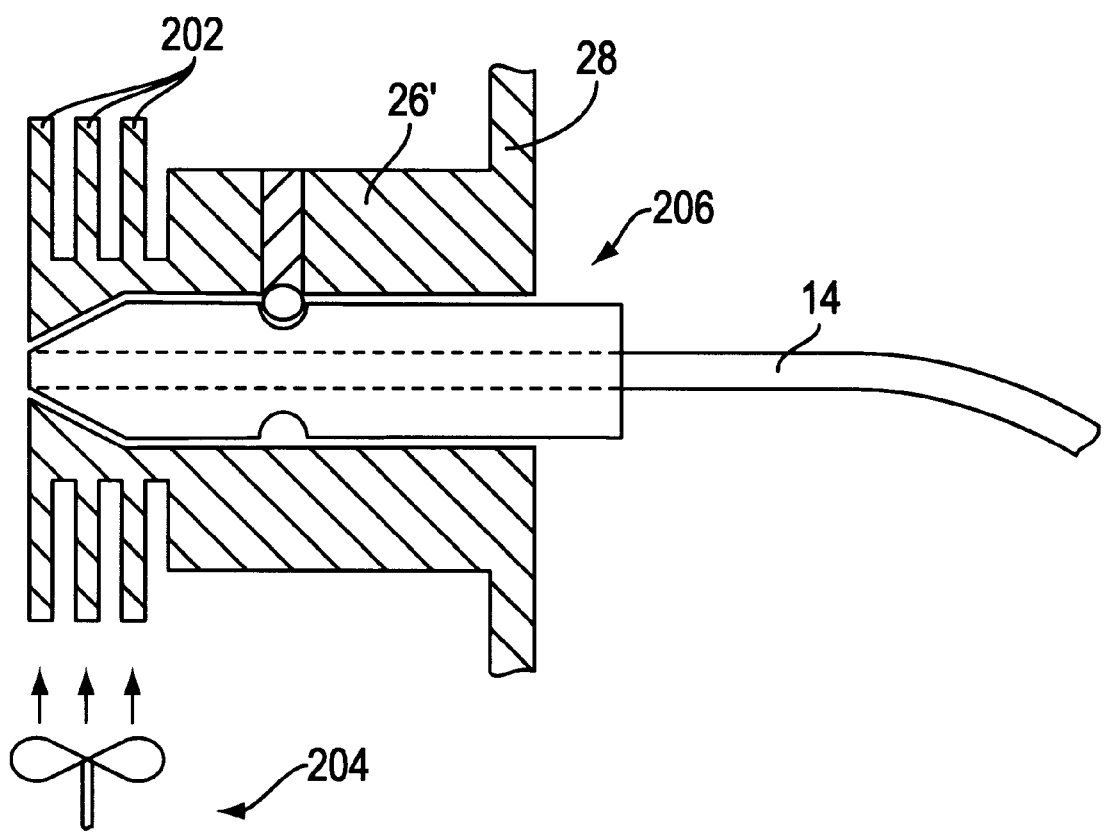
FIG. 6 is a side view, partially in cross-section, showing a modification to the housing shown in FIG. 2 which permits use of a higher intensity, higher wattage light source.

A modification to the light source system 16 which facilitates this is shown in FIG. 6. In particular, receiving block 26' is provided with a plurality of cooling vanes 202 and a blower fan 204 mounted within the housing to circulate air over the cooling vanes 202. The configuration of the proximal connector 206 and the receiving block 26' are otherwise the same as in the embodiments described above, and the materials used in the ferrule and the receiving block can be stainless steel, aluminum, nickel-plated brass or copper, or other high thermal conductivity material. Thus, whereas the above-described embodiments are capable of transmitting on the order of one watt of visible light through a 760 $\mu$m quartz fiber, with a 100 W short arc xenon lamp used as the light source, providing cooling vanes 202 and cooling fan 204 to circulate air across the vanes permits on the order of 3 to 5W of visible light and up to 10 W of broadband light to be transmitted through the same 760 $\mu$m quartz fiber, the light being generated by a 500 W xenon system with an otherwise similar optical arrangement. For higher wattage lamps and light output requirements, progressively larger receiver blocks, cooling vanes, and cooling fans can be used.

Another high-wattage configuration is shown in FIG. 7. In this configuration, the receiving block 26" is similar to the receiving block 26' shown in FIG. 6 in that it has cooling vanes 202' and a cooling fan (not shown), mounted where convenient within the interior of the illuminator housing, to circulate air over the cooling vanes 202'. The profile of the aperture in the receiving block 26' is configured so as to receive in close thermal contact the light-receiving end of adaptor connector 302.

Adaptor connector 302 houses an intermediate light collecting fiber 304, which is aligned to receive and couple light focused at the aperture end 306 thereof into snap-in proximal connector 308. The light-receiving end of adaptor connector 302 has conical ferrule portions to facilitate close thermal contact with the walls of the aperture in the receiving block 26", which facilitates the transfer of heat away from fiber 304, as well as an indented ring which receives spring-biased ball plunger 46" to secure the connector adaptor 302 within the aperture. The light-receiving end of adapter connector 302 may be constructed with the aperture end 306 of the fiber 304 non-retractable and non-covered, similar to connector configurations otherwise known in the art.

The opposite end 310 of adaptor connector 302, in turn, has a receiving aperture 312 which is configured generally the 20 same as or similar to the apertures in receiving blocks 26 or 26' in the embodiments described above, as well as a spring-biased ball plunger 314. The aperture 312 is configured to receive proximal connector 308, which also is constructed according to any of the embodiments described above, e.g., in FIGS. 2 through 6. In other words, the configuration of the aperture 312 and proximal connector 308 are such that optic fiber element 309 housed within connector 308 is aligned with intermediate light collecting fiber 304 to receive light from the source and transmitted therethrough, and the end 310 of adaptor connector 302 absorbs heat from proximal connector 308, thereby helping to keep fiber 309 from heating excessively. The adaptor connector 302 also has cooling vanes 316 extending therefrom to help dissipate heat.

It will be appreciated that with this configuration, the proximal connector 308 can be constructed generally smaller, and hence less expensively, than the above-described proximal connectors can be constructed. This is because the proximal connector 308 is generally more remote from the light source as compared to the above-described embodiments, and therefore less thermal energy is focused directly on it. As a result, proximal connector 308 does not need to have the same thermal mass or heat-sink capacity as the proximal connectors described above need to have. Thus, using a 500 W xenon lamp and an off-axis light-collecting and condensing configuration, as described in U.S. Pat. No. 4,757,431, approximately 3 to 5 W of visible light can be transmitted through optic fiber element 304, which may be a 760 $\mu$m quartz optical fiber or a 1 mm fused fiber bundle, and 1 to 2 W of light ultimately can be transmitted through optic fiber element 309, housed within proximal connector 308, which may be an 800 $\mu$m quartz or 1 mm plastic optic fiber. Alternatively, making optic fiber element 304 as a tapered fused fiber bundle or tapered cladded rod permits enhanced coupling to output optic fiber element 309, so that 10 W or more of visible light can be transmitted efficiently through optic fiber element 304. Other modifications which are within the abilities of those having skill in the art will permit up to 100 W of light to be carried by element 304 and up to 50 W of light to be carried by element 309.

A similar embodiment is shown in FIG. 8. In this embodiment, the adaptor connector 302' may be constructed with the light-receiving portion 320 thereof constructed in accordance with other known proximal connector configurations. For example, the portion 320 can have a retractable cover 322 which covers the end of intermediate optic fiber 324 and which moves out of the way when the adaptor connector 302' is inserted into an appropriately configured receiving block portion 326. Such a configuration is described, for example, in U.S. Pat. No. 5,446,818 or U.S. Pat. No. 5,452,392, the disclosures of which are incorporated herein by reference. Like the proximal connector 308 shown in FIG. 7, the proximal connector 308' may be configured like any of the above-described proximal connectors, and the adaptor connector 302' has a correspondingly configured aperture 312' which receives the proximal connector 308' in close-fitting, heat-transferring relation, with fiber element 308' aligned with intermediate optic fiber 324 to receive light coupled therethrough from the source. Spring-biased ball plunger 314' secures the connector 308' in position within the aperture 312'. This embodiment can be used to couple proximal connector 308' to a 500 W illuminator available from Cogent Light in Santa Clarita, Calif. Thus, using a 500 W xenon lamp and an off-axis light-collecting and condensing configuration, as described in U.S. Pat. No. 4,757,431, approximately 3 to 5 W of visible light can be transmitted through optic fiber element 324, which may be a 760 $\mu$m quartz optical fiber or a 1 mm fused fiber bundle, and 1 to 2 W of light ultimately can be transmitted through optic fiber element 309', housed within proximal connector 308', which may be an 800 $\mu$m quartz or 1 mm plastic optic fiber. Various modifications which are within the abilities of those having skill in the art will permit up to 100 W of light to be carried by element 324 and up to 50 W of light to be carried by element 309'.

Figure 9:
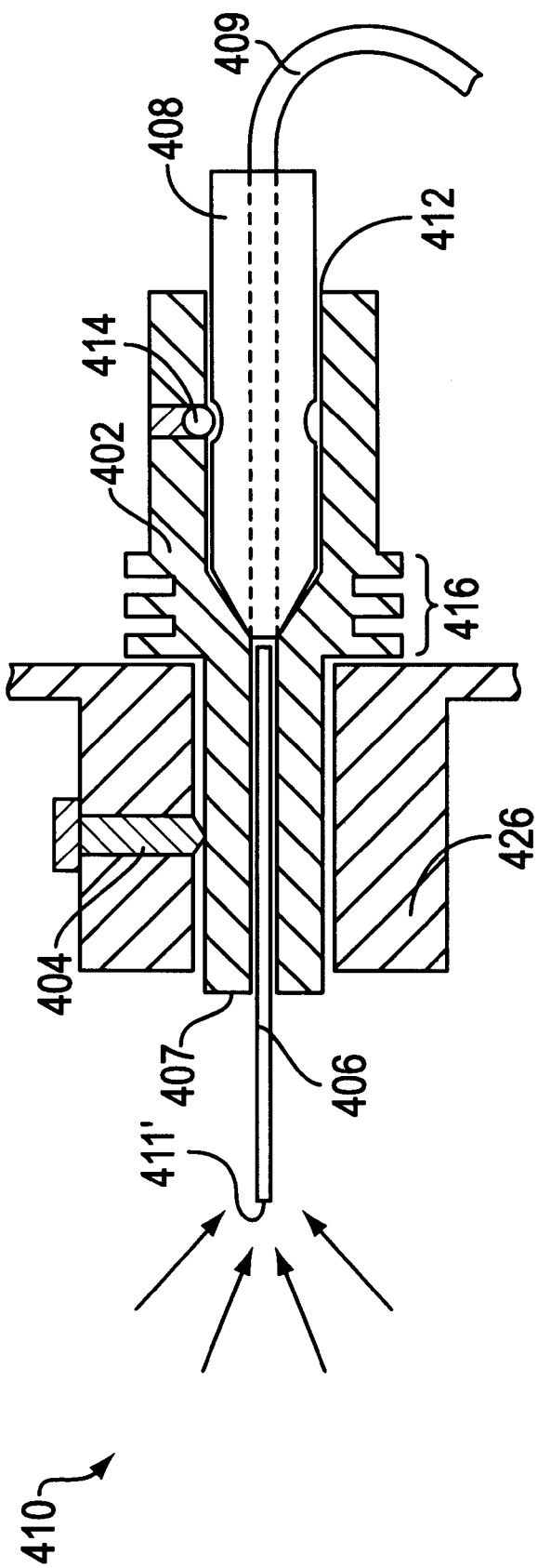

Finally, a further embodiment which permits increased light power to be coupled into the proximal connector with generally reduced amount of heating is shown in FIG. 9. In this embodiment, the fixed adaptor connector 402 is permanently secured in close, heat-absorbing contact within receiving block 426 by means, e.g., of a locking screw or set screw 404. Fiber optic element 406, which can be a single fiber optic element or a fused fiber bundle, extends beyond the end 407 of the fixed adaptor connector 402 and into the interior of the illuminator by a certain distance. The distance is sufficient for light 410 which is focused at the aperture end 411 of the fiber optic element 406 but which does not enter the fiber optic element 406 to spread out or diffuse before it strikes the fixed adaptor connector 402 and receiving block 426. This significantly reduces the concentration of heat which is absorbed by the receiving block 426 and the portion of the fixed adaptor connector 402 received therein, thus reducing the temperature of the fiber optic element 406 and thereby permitting greater light power to be coupled into fiber optic element 406, i.e., 3–5 W of light power using a 500 W xenon lamp and light-collecting and coupling configuration described above, with fiber optic elements 406 and 409 being as described above or, if desired, larger to transmit even more light (e.g. a 2.5 mm fused fiber bundle to couple 8–10 W of visible light into output fiber element 409). As is the case for the embodiment shown in FIG. 7, making fiber element 406 as a tapered fused fiber bundle or tapered cladded rod permits enhanced coupling to output optic fiber element 409, so that 10 W or more of visible light can be transmitted efficiently through optic fiber element 406. other modifications within the abilities of those having skill in the art will permit up to 100 W of light to be carried by element 406 and up to 50 W of light to be carried by element 409. Like the embodiments shown in FIGS. 7 and 8, the adaptor connector 402 has heat-dissipating cooling vanes 416 and a proximal connector-receiving aperture 412 which receives therein proximal connector 408, with optic fiber element 409 aligned with optic fiber element 406. Spring-biased ball plunger 414 engages an indented ring in the periphery of the proximal connector 408 and secures the connector 408 in close thermal contact with the walls of the aperture, as described above in the context of the other embodiments.

Since many modifications, variations and changes in detail may be made to the described embodiments, it is intended that all matter in the foregoing description and shown in the accompanying drawings be interpreted as illustrative and not in a limiting sense.

What is claimed is:

1. In a system for coupling light from a high intensity light source, said system including an optical system for collecting and condensing light from said high intensity light source into a first optic fiber element, wherein the source is disposed within a housing and wherein the first optic fiber element is removably inserted within a first aperture formed in the housing, an improvement comprising:

mounting an end of the first optic fiber element within a first cone-shaped ferrule;

configuring the first aperture with a cone shape, sized for closely receiving said first cone-shaped ferrule and bringing the housing and first ferrule into heat-conducting contact, such that precise alignment between the first optic fiber element and the system for coupling said high intensity light into said first optic fiber element is preserved and heat transfer away from the first optic fiber element is facilitated;

wherein the first ferrule and sidewalls of the first aperture are both constructed from a material having a high index of heat conduction; and wherein light passing through said first optic fiber element has a power level within a range of greater than 1 watt up to about 100 watts.

2. The improvement of claim 1, wherein said first aperture is formed in a receiving block extending into said housing and said receiving block has a plurality of cooling vanes formed thereon.

3. The improvement of claim 2, wherein a cooling fan is provided to circulate air over said cooling vanes.

4. The improvement of claim 1, wherein said ferrule is formed at a light-receiving end of a proximal connector housing said end of said first optic fiber element.

5. The improvement of claim 1, wherein said first ferrule is formed at a light-receiving end of an adaptor connector which is received within said first aperture, said adaptor connector having an optic fiber-receiving end, opposite said light-receiving end, configured to receive an end of a second optic fiber element which receives from and transmits light transmitted through said first optic fiber element.

6. The improvement of claim 5, wherein said first optic fiber element comprises an element selected from the group consisting of quartz fiber, fused fiber bundle, tapered fused fiber bundle, cladded rod, and tapered cladded rod.

7. The improvement of claim 5, wherein said second optic fiber element transmits light having a power level up to about 50 watts.

8. The improvement of claim 5, wherein the end of said second optic fiber element is mounted within a second cone-shaped ferrule;

said optic fiber-receiving end of said adaptor connector has a second aperture with a cone shape, sized for closely receiving said second cone-shaped ferrule and bringing the adaptor connector and said second ferrule into heat-conducting contact, such that precise alignment between the first optic fiber element and the second optic fiber element is preserved and heat transfer away from the second optic fiber element is facilitated; and wherein the second ferrule and sidewalls of the second aperture are both constructed from a material having a high index of heat conduction.

9. The improvement of claim 5, wherein the optic fiber-receiving end of said adaptor connector has cooling vanes formed thereon to facilitate transfer of heat away from the end of said second optic fiber element.

10. In a system for coupling light from a high intensity light source, said system including an optical system for collecting and condensing light from said high intensity light source into a first optic fiber element, wherein the source is disposed within a housing and wherein the first optic fiber element is inserted within a first aperture formed in the housing, an improvement comprising:

mounting said first optic fiber element in a connector received within said first aperture, said connector being in close thermal contact with sidewalls of said first aperture with precise alignment between the first optic fiber element and the system for coupling said high intensity light into said first optic fiber element being preserved and heat transfer away from the first optic fiber element being facilitated, with an end of said first optic fiber element extending into said housing a distance beyond a first, light-receiving end of said connector sufficient for light focused at an aperture of said first optic fiber element but not entering said first optic fiber element to diffuse or dissipate before striking said connector;

wherein said connector and said sidewalls of the first aperture are both constructed from a material having a high index of heat conduction; and wherein light passing through said first optic fiber element has a power level within a range of greater than 1 watt up to about 100 watts.

11. The improvement of claim 10, wherein said connector has an optic fiber-receiving end, opposite said light-receiving end, configured to receive an end of a second optic fiber element which receives from and transmits light transmitted through said first optic fiber element.

12. The improvement of claim 11, wherein said first optic fiber element comprises an element selected from the group consisting of quartz fiber, fused fiber bundle, tapered fused fiber bundle, cladded rod, and tapered cladded rod.

13. The improvement of claim 11, wherein said second optic fiber element transmits light having a power level up to about 50 watts.

14. The improvement of claim 11, wherein the end of said second optic fiber element is mounted within a cone-shaped ferrule;

said optic fiber-receiving end of said connector has a second, cone-shaped aperture sized for closely receiving said cone-shaped ferrule and bringing the connector and the ferrule into heat-conducting contact such that precise alignment between the first optic fiber element and the second optic fiber element is preserved and heat transfer away from the second optic fiber element is facilitated; and wherein the ferrule and sidewalls of the second aperture are both constructed from a material having a high index of heat conduction.

15. The improvement of claim 11, wherein the optic fiber-receiving end of said connector has cooling vanes formed thereon to facilitate transfer of heat away from the end of said second optic fiber element.

* * * * *